United States Patent [19]

Hambric

[11] Patent Number: 4,567,784

[45] Date of Patent: Feb. 4, 1986

[54] METHOD AND APPARATUS FOR LUBRICATING A TRANSMISSION

[75] Inventor: James C. Hambric, Wellsville, N.Y.

[73] Assignee: Dresser Industries, Inc., Dallas, Tex.

[21] Appl. No.: 480,679

[22] Filed: Mar. 31, 1983

[51] Int. Cl.$^4$ ............................................. F16H 57/04
[52] U.S. Cl. ..................................... 74/467; 184/6.12; 184/13.1; 74/785
[58] Field of Search .......................... 74/467, 801, 785; 184/6.12, 13.1, 6.0, 11.3

[56] References Cited

U.S. PATENT DOCUMENTS

| | | | |
|---|---|---|---|
| 1,299,156 | 4/1919 | Fast | 74/467 |
| 1,878,729 | 9/1932 | Sykes | 184/6.12 |
| 2,169,296 | 8/1939 | Smith | 184/6 X |
| 2,406,388 | 8/1946 | Larreco | 184/6.12 |
| 2,926,755 | 3/1960 | Kolbe | 184/6 |
| 3,065,822 | 11/1962 | McAfee et al. | 184/6 |
| 3,230,796 | 1/1966 | Thomson | 74/781 |
| 3,583,526 | 6/1971 | Mulleder | 184/6 |
| 4,148,229 | 4/1979 | Kuramuchi et al. | 74/467 X |
| 4,273,003 | 6/1981 | Schultz | 74/467 |
| 4,329,887 | 5/1982 | Kawamoto | 74/467 |
| 4,418,777 | 12/1983 | Stockton | 74/467 X |

FOREIGN PATENT DOCUMENTS

| | | |
|---|---|---|
| 146327 | 2/1981 | Fed. Rep. of Germany . |
| 55-24279 | 2/1980 | Japan .................................. 74/467 |
| 56-35860 | 4/1981 | Japan . |
| 259222 | 11/1926 | United Kingdom . |
| 1102459 | 2/1968 | United Kingdom ..................... 184/6 |

Primary Examiner—Rodney H. Bonck
Assistant Examiner—Shirish Desai

[57] ABSTRACT

A method and apparatus are provided for lubricating a sun gear 32 connected to a hollow coupling shaft 30 which is adapted to be joined to a source of rotational energy. The shaft 30 defines at least one opening 90 intermediate its ends which is adapted to receive a source 92 of lubricating fluid under pressure periodically throughout the rotational cycle of the shaft. By damming 108 the periphery of the opening on the interior of the shaft 30, the film of lubricating fluid formed along the interior surface of the shaft by centrifugal force is precluded from draining out of the opening 90 when that opening is not supplied with lubricating fluid under pressure. Channels 142 are provided across the walls 96 of the shaft to distribute the lubricating fluid thereformed axially towards the sun gear 32. Means 102 are also provided on the interior of the shaft 30 to axially distribute the entering oil and to preclude oil entering the opening from being discharged across the shaft and out of another opening which is not aligned with a source of lubricating fluid.

24 Claims, 6 Drawing Figures

METHOD AND APPARATUS FOR LUBRICATING A TRANSMISSION

TECHNICAL FIELD

This invention relates to lubricating systems in general and, in particular, to a method and apparatus used to lubricate a free-floating quill shaft in a reduction gear or planetary transmission, planet bearings and gear meshes.

BACKGROUND OF THE INVENTION

For any rotating system requiring lubrication it is essential to have the oil or lubricating fluid enter at the smallest inner radius possible. This is because centrifugal force causes whatever fluid is emitted to the center of the rotating system to flow towards the outer portions of the system. U.S. Pat. No. 1,184,609 represents the basic technique.

In a differential planetary transmission, planet gears (compound type) are mounted in or on a rotating carrier assembly which itself is supported by a set of bearings. A sun gear at the interior of the carrier drives the planetary gears. With the exception of an opening for the sun gears, the ends of the carrier are typically closed to provide structural support for the planetary gears and to accommodate the bearings which support the carrier. Accordingly, lubricating fluid cannot be injected into the rotating assembly from the ends of the carrier and into the sun gear meshes (cf. U.S. Pat. Nos. 3,230,796; 3,065,822; Japan No. 56-35860; East German No. 146,327; and U.K. No. 259,222). Lubricating fluid cannot be efficiently injected from an external source beyond the diameter of the rotating assembly because of the action of centrifugal force. Centrifugal force limits the degree of penetration of the lubricating fluid sprayed directly on the rotating system. If penetration were attempted by spraying oil from an external diameter, the oil pressure or lubricating fluid pressure would have to be very high to counteract the effect of centrifugal force. High pressure lubricating systems are expensive, not only from a first cost point of view, but also from a maintenance and operating cost point of view. Moreover, if lubricating fluid could be injected from one end of the carrier, or through an opening in the carrier between the planetary gears, it would enter on an intermittent basis since the carrier itself is rotating. Thus, it is difficult to design an efficient, effective, low cost lubricating system for a planetary transmission.

There have been several attempts by others to supply lubricating fluid to the interior of a rotating geared shaft from a source on the periphery of the shaft (i.e., U.S. Pat. Nos. 1,299,156 and 2,926,755). However, there are added difficulties when the transmission shaft is a thin-walled quill shaft which is directly driven by a steam turbine operating at optimum velocity ratios and at the highest possible efficiency (e.g., 20,000 RPM). In addition, if the transmission is driven by a shaft which is not supported by journal bearings, lubricating fluid must not only be made to somehow enter the shaft from a position intermediate the ends of that shaft, but also lubricating fluid must be transferred to the interior of that shaft without any direct mechanical or fluid coupling (cf., U.S. Pat. Nos. 1,299,156 and 2,926,755). Thus, a modern innovative and preferably practical approach to an otherwise basic design problem is needed.

SUMMARY OF THE INVENTION

In accordance with the present invention a method and apparatus are provided for lubricating a hollow shaft having one end adapted to mesh with and to drive a reduction gear apparatus and an opposite end adapted to be coupled to a prime mover rotating at a high rate of speed. In particular, a source of lubricating fluid under pressure is provided which discharges, through fixed jets positioned at a spaced distance from the exterior surface of the shaft, into ports or openings provided in the shaft when those openings are aligned with the jet. The interior surface of the shaft around the periphery of the openings are dammed so that fluid entering into the interior of the shaft, (and discharged onto the interior surface of the shaft by centrifugal force) is precluded from flowing out of the opening when the opening is not aligned with the jet. The fluid accumulating on the interior surface of the shaft is ducted towards that end of the shaft which meshes with the reduction gear apparatus. Openings are provided at the meshing end to communicate the interior of the shaft with the roots of the gear teeth at that end of the shaft, whereby centrifugal force discharges the lubricating fluid into the meshing teeth of the shaft and the reduction gear apparatus. Thus, fluid is supplied continuously to the meshing gears even though the lubricating fluid is only periodically discharged into the interior of the shaft intermittently.

In one embodiment a plurality of openings is provided in the walls of the shaft which are periodically aligned with corresponding jets which discharge lubricating fluid into the interior of the shaft. A obstacle is provided at the interior of the shaft for the purpose of diverting or directing the fluid radially entering into the shaft towards each end of the shaft. In addition, angularly spaced apart channels are provided between the dammed openings at the interior of the shaft to uniformally distribute the oil film formed on the interior of the shaft. Channels are also provided to direct a portion of the oil at the interior of the shaft towards and into the coupling between the prime mover and the shaft.

In one particular embodiment a free-floating, hollow, quill shaft is provided with a removable insert which dams the openings on the interior of the shaft through which the lubricating fluid enters the shaft and distributes the entering fluid axially towards each end of the shaft.

The advantages and features of the present invention will become readily apparent from the detailed description of the invention, the embodiments presented, the accompanying drawings and the claims.

DETAILED DESCRIPTION OF THE PREFERRED EMBODIMENT

Figure 1:
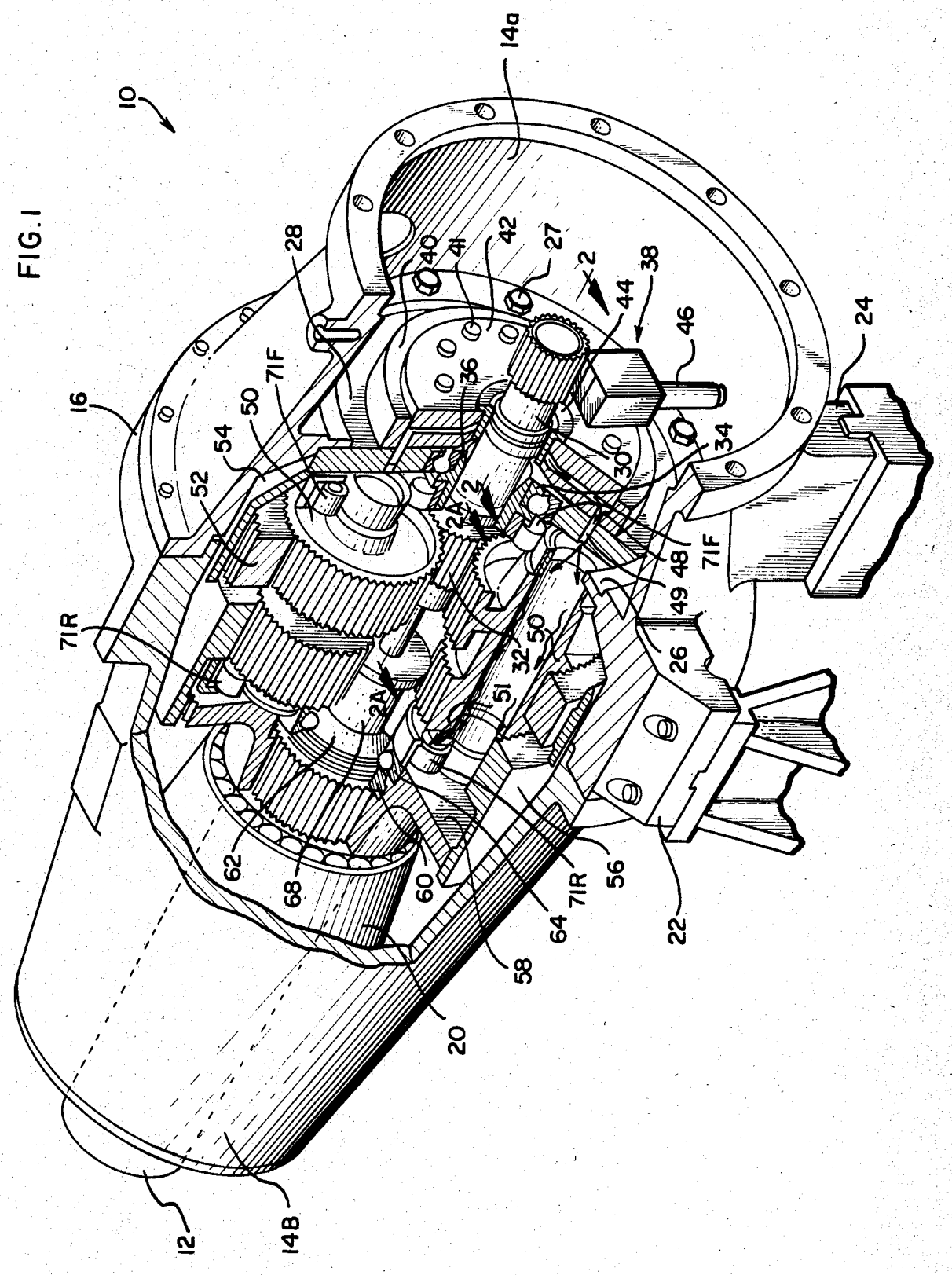
FIG. 1 is a perspective cutaway view of an epicyclic differential transmission incorporating the subject invention.

While this invention is susceptible of embodiment in many different forms, there is shown in the drawings and will herein be described in detail one specific embodiment, with the understanding that the present disclosure is to be considered as an exemplication of the principles of the invention and is not intended to limit the invention to the specific embodiment illustrated.

Turning to the drawings, FIG. 1 illustrates a modern differential, epicyclic transmission 10 adapted to be driven by and be coupled to the output shaft of a high-speed steam turbine. Different ratios of planetary gearing are used to satisfy the output speed requirement. Since a turbine is preferably operated at or near a speed consistant with its optimum velocity ratio, the output speed of the transmission is designed to match the speed required by the load. In the case of a steam turbine operating at 20,000 rpm, a prototype differential transmission 10 has been designed which can efficiently drive the output shaft 12 in a speed range of 500 to 1200 RPM or even lower speeds.

To better understand the unique method and apparatus that is the subject of the present invention, the overall environment of the invention and the principal components of the transmission 10 will now be described. The transmission 10 is housed within a generally cylindrical, vertically split, two-part casing 14a and 14b. The inboard (or turbine end) casing member 14a is generally frusto-conical in shape. The outboard end of the inboard casing 14a is flange mounted to the outboard (or load end) casing 14b. A similar flange is provided at the inboard end to attach the transmission 10 to the prime mover or steam turbine which drives the transmission. The outboard casing 14b carries an output shaft bearing support member 20 which supports the output shaft 12. The inboard casing 14a is provided with two mounting shoes or pads 22 (the right-hand pad being hidden from view in FIG. 1) and an axial guide shoe 24. Centerline guided support, with a fixed output end, provides for even thermal expansion of the transmission gear casing away from the direction of the driven equipment. This assures that the driven equipment is unlikely to be subjected to unpredictable and potentially damaging stresses.

The components housed within the two transmission casings 14a and 14b will now be described. The inboard casing 14a defines an intergal inwardly disposed lip 26 which is used to mount the operating components of the transmission 10. A series of bolts 27 are used to connect a disk-like carrier support member 28 to the lip 26 of the inboard housing 14a. The center of the carrier support 28 is provided with an opening through which a free floating quill shaft 30 is disposed. The "free floating" aspect of the hollow quill shaft 30 will be described later. The quill shaft 30 is splined at one end (the inboard end) to couple the quill shaft to the prime mover. The opposite or outboard end of the quill shaft 30 defines a sun gear 32. The outboard or rear end of the carrier support 28 defines a ball bearing assembly 34. Attached thereto is a planet carrier assembly or carrier 36. More will be said about the carrier 36 at a later point in the description.

The forward or inboard end of the carrier support 28 supports an oil distribution manifold assembly 38. In this particular embodiment, the oil distribution manifold assembly 38 includes a base cap 40, a top cap 42, and an oil jet holder 44. The top cap 42 is connected to a source of lubricating fluid under pressure or an oil supply 46. The base cap 40 and the top cap 42 are joined together by bolts 41 and define a series of interior passageways which channel oil to the oil jet holder 44 and a plurality of openings 48 in the fixed carrier support 28. The carrier support is provided with a plurality of oil distribution jets 49 (not shown in FIG. 1 to simplify the drawing) which in turn supply oil intermittently to the interior of the revolving gears mounted on the carrier 36. Oil accumulating along the interior walls of the planetary gears 50 is then channeled through openings 51 to lubricate the bearings at either end of the planetary gears.

Turning now to the outboard side of the carrier support 28, the carrier 36 rotatably supports three double compound planetary gears 50 (one of which is hidden from view in FIG. 1). Each end of each planetary gear 50 is supported by a roller bearing assembly which is mounted within the carrier 36. All rolling element bearings should be capable of accepting high surface stresses. VIMVARM-50 (double vacuum melt) steel construction is preferred in that it provides an extremely long life expectancy which results in high reliability. The lifetime of VIMVARM-50 gears is expected to be 50 times that of conventional air melt steel. The inboard end of each planetary gear 50 meshes with the sun gear 32 on the quill shaft 30. The inboard planetary gears also mesh with a fixed input or inboard ring-gear 52 which is splined to a skirt 54 on the inboard end of the carrier support 28. Each outboard planetary gear meshes with an output ring-gear 56. An output adapter ring 58 is splined to the output ring-gear 56 and to the output shaft 12. The output shaft 12 is, of course, rotatably supported within the output shaft bearing support 20. The output shaft 12 is additionally supported by a duplex ball bearing at the output end which takes both the radial load and any thrust load from driven equipment. A lock ring 60, held in place by a threaded end locknut 62, secures the output adapter ring 58 to the output shaft 12. The output adapter ring 58 is also provided with a ball bearing assembly 64 to support the outboard end of the carrier 36. The quill shaft 30 is prevented from being axially displaced in the outboard direction by a spacer element 68 (Also see FIG. 2A) carried at the center of the outboard end of the carrier 36.

Now that the major components of the transmission 10 have been described, the unique lubrication system for the quill shaft 30 will be explained using FIGS. 2 and 2A. It will be recalled that the fixed carrier support 28 positions and carries at its inboard end a base cap 40 and at its out-board end the carrier inboard bearing assembly 34 which rotationally supports one end of the carrier 36 relative to the quill shaft 30. A plurality of bolts 41 holds the base cap 40 and the top cap 42 to the fixed carrier support 28. In this embodiment the oil jet holder 44 is housed within the top cap 42, the base cap 40 and the carrier support 28. In particular, it is threadedly connected to the base cap 40. Two seals 80 insure that oil entering the oil distribution manifold assembly 38 does not leak out either end of the oil jet holder 44. Here the quill shaft 30 is shown joined to the output shaft 82 of a prime mover, such as a steam turbine, by means of a splined coupling 84. The coupling 84 includes a collar 86 and a collar lock 88. The collar lock holds the collar 86 on the end of output shaft 82.

Figure 2:
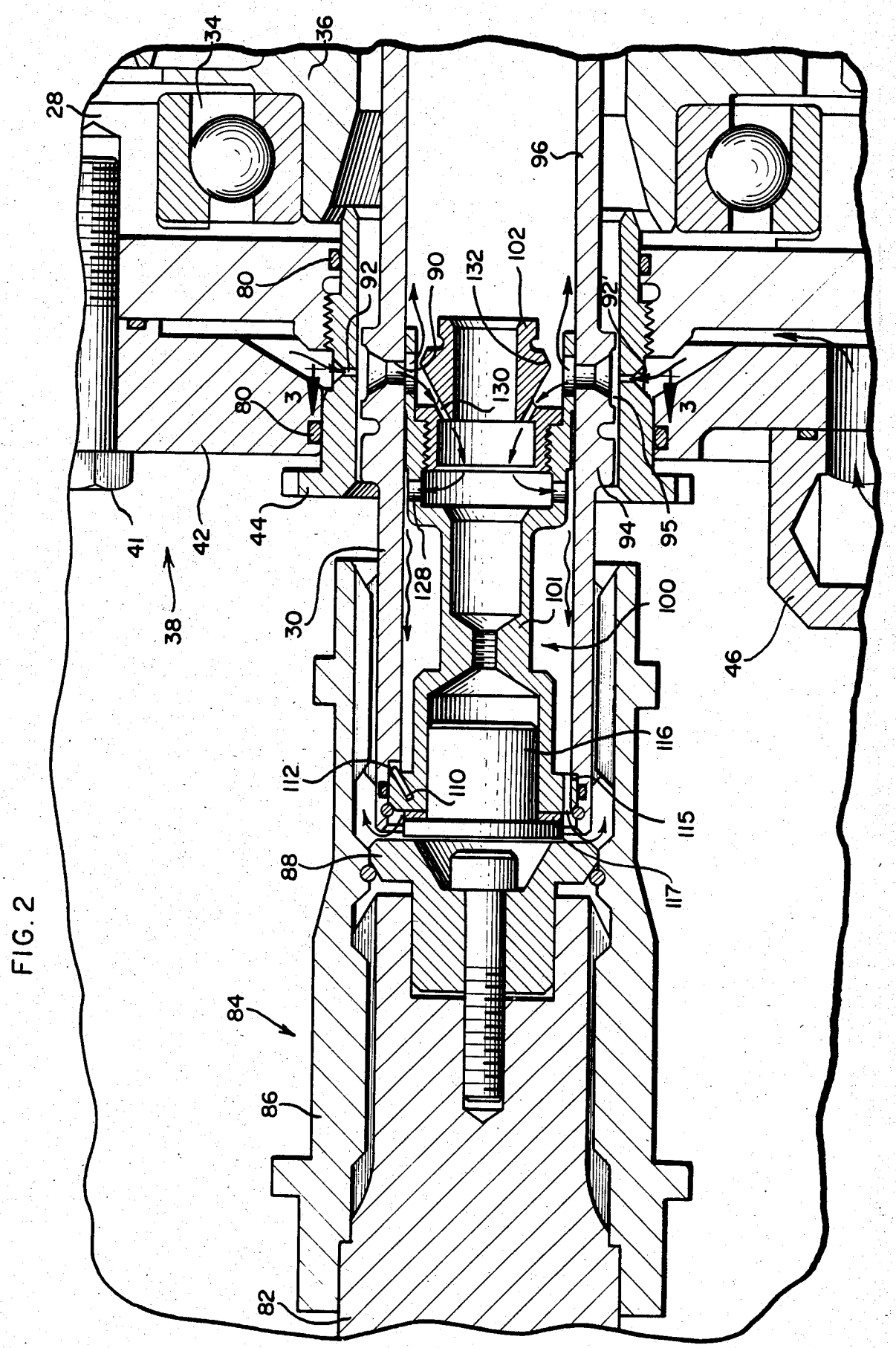
FIGS. 2 and 2A are an enlarged, cross-sectional side view of the quill shaft and the associated components as viewed along line 2—2 of FIG. 1.
Figure 2A:
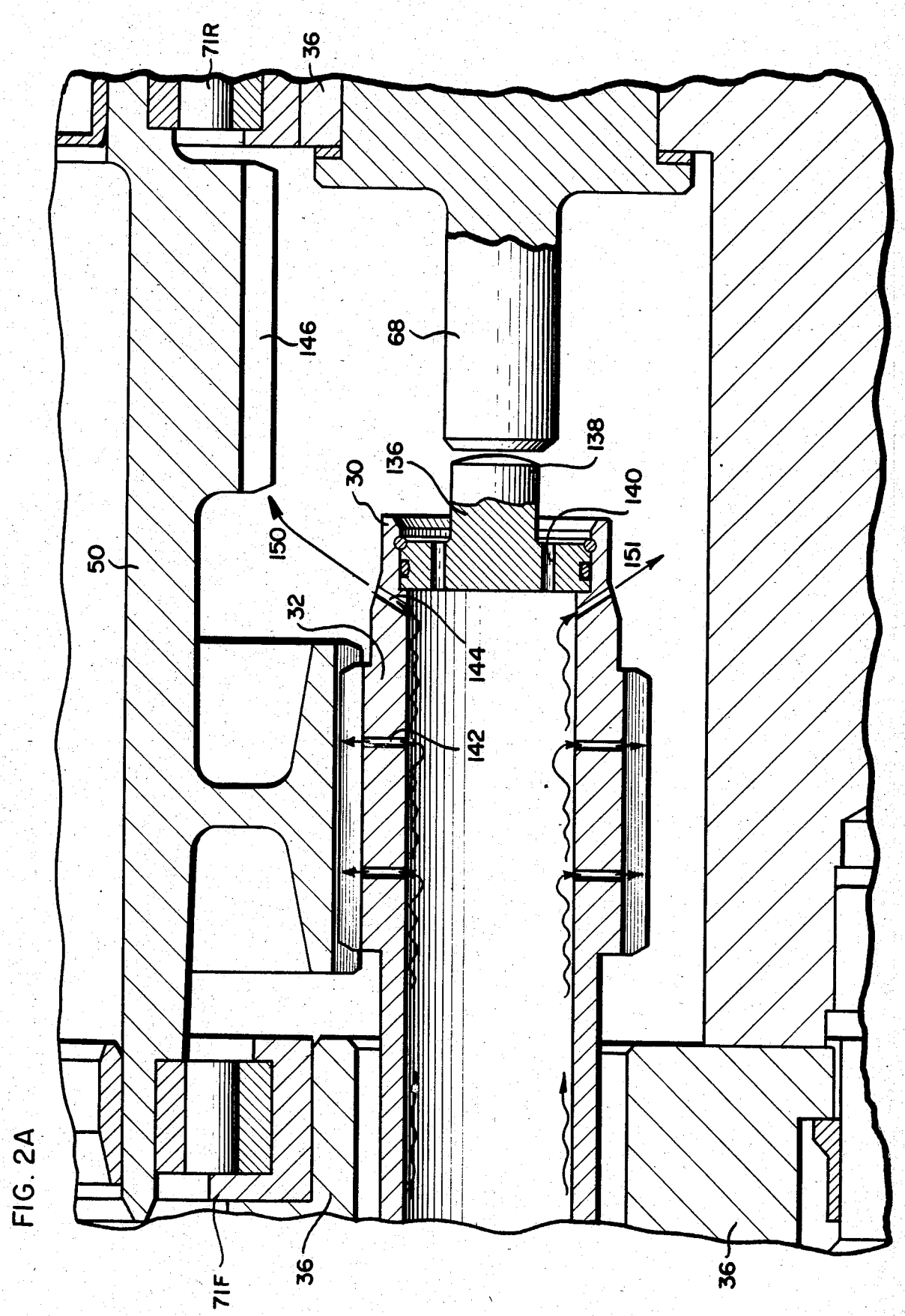

Turning now to FIG. 2A the outboard end of the quill shaft 30 is illustrated. It will be recalled that each planetary gear 50 is supported at each of its ends by roller bearings 71F and 71R held at each end of the carrier 36. The inboard end of each compound planetary gear 50 meshes with the sun gear 32 at the outboard end of the quill shaft 30. Finally, the spacer element 68 is shown shimmed in place at the outboard end of the carrier 36.

From the foregoing description it should be clear that the quill shaft's 30 only contact with the apparatus of the transmission 10 is through the teeth of the sun gear 32. Thus, in this embodiment quill shaft 30 is bearingless and receives radial support only from planetary gears 50 and the splined end of the output shaft 84 of the prime mover. Since the planetary gears 50 rotate relative to the carrier 36, the radial position of the outboard end of the quill shaft nutates or precesses through a closed path determined by the centers of the planetary gears 50 relative to the carrier 36. Similarly, since the inboard end of the quill shaft 30 is coupled to the rear end of the output shaft 82 of the prime mover, the radial position of the inboard end of the quill shaft is determined by the eccentricity of the axes of each shaft. In other words, the quill shaft can be said to be "free-floating" relative to the three planetary gears 50 and the output shaft 82 of the prime mover. It should also be appreciated that the oil jet holder 44 is fixed relative to the quill shaft 30 and that the carrier 36, the planetary gears 50 and the spacer element 68 rotate relative to the quill shaft 30.

Referring now to FIG. 2, the quill shaft 30 is hollow and defines a plurality of radially disposed openings 90 which are periodically aligned with ports or metering jets 92 within the oil jet holder 44. The radially disposed openings 90 are preferably formed in a thickened portion 94 of the walls 96 of the quill shaft 30. The thickened portion 94 is disposed intermediate the ends of the quill shaft 30. Since the shaft openings 90 are only periodically aligned with the metering jets 92, oil flows intermittently into the interior of the quill shaft when the lubrication system or oil supply 46 is running and the quill shaft is rotated by the prime mover. A circumferential channel 95 helps equalize the oil distribution and reduces the outflow of oil when the openings 90 are not aligned with a jet.

Now if the interior of the quill shaft 30 were free of all obstructions, it should be clear that the oil entering the interior of the shaft would be discharged (i.e., "fan-out") to the interior surface of the shaft walls 96 by the action of centrifugal force when the shaft 30 is rotated by the prime mover. It also should be clear that, when those openings 90 in the quill shaft 30 are not aligned with the metering jets 92, a portion of the oil or lubricating fluid adhering to the interior walls would be free to flow out of those same openings. It should also be clear that if two opposed openings 90 are diametrically opposed to each other and if only one metering jet 92 is aligned with one of the opposed two shaft openings, oil would be free to be discharged from one of the openings, into and across the interior of the shaft, and out of the opposite opening. In either case oil would be lost periodically throughout the rotational cycle of the shaft. This loss would have to be accommodated or "made-up" by providing an oil supply 46 substantially greater in size then what would be required if all of the fluid entering the shaft could be utilized. Thus, a means must be provided to obstruct the flow path between two diametrically opposed shaft openings 90 and to preclude oil which has accumulated along the interior surface of the shaft wall 96 from being discharge out of those same openings through which the oil entered the interior of the shaft when those openings were aligned with a metering jet 92. An oil distribution and damming means 100 (hereinafter atternatively referred to as the "distributor") is provided to accomplish these functions.

The distributor 100 includes a shaft insert member or insert 101 (See FIGS. 4 and 5) and a deflector 102. The insert snuggly fits within one end (here the inboard end) of the quill shaft 30 and the deflector 102, fits within and is joined to the outboard end of the insert 101. In addition to supporting the deflector 102 the insert 101 is used to plug the inboard end of the quill shaft 30.

Figure 4:
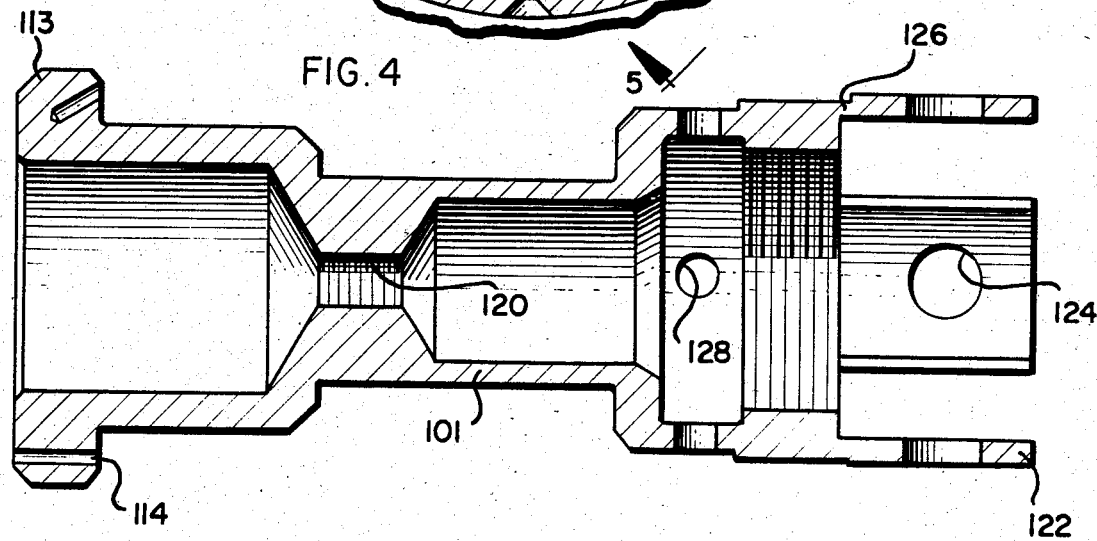
FIG. 4 is an enlarged, cross-sectional, side view of the lubricating oil distributor which fits within the quill shaft shown in FIG. 2.
Figure 5:
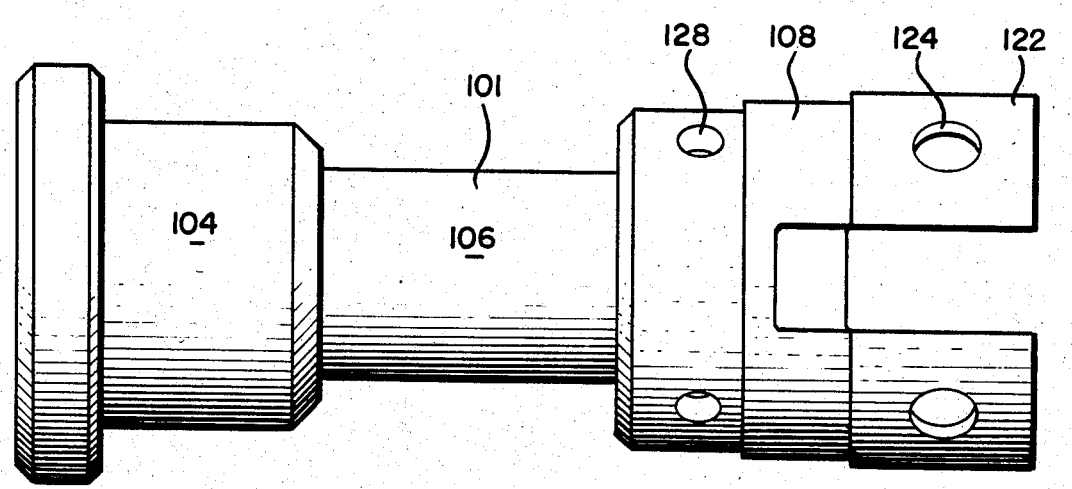
FIG. 5 is an enlarged side view of the insert shown in FIG. 4 which has been rotated 45 degrees to better show the details of its construction.

Turning now to FIGS. 4 and 5, the insert 101 will now be described in greater detail. The insert 101 has three functional portions: a bell-shaped end portion 104, a center portion, and a castellated dam portion 108. The center portion 106 largely functions to position or space the dam portion 108 at the correct distance from the inboard end of the quill shaft 30. For the purpose of removing the insert 101, the intermediate portion 106 of the insert 101 is provided with a threaded bore 120 (See FIG. 4). A threaded rod or tool may then be used to extract the insert 101 from the inboard end of the quill shaft 30.

The end portion 104 has several functions. It is used to azimuthally locate the insert 101 relative to the openings 90 in the quill shaft 30. This is most conveniently performed by using a dowell pin 110 which fits in a key way 112 at the inboard end of the quill shaft 30. The inboard end of the insert 101 defines a flange-like lip 113 which sets within a complementary resess 115 at the inboard end of the quill shaft 30. The end portion 104 is also provided with a plurality of axial passageways 114 (only one being shown for purposes of illustration in FIG. 4) which are evenly spaced around the periphery of the lip 113 at the end of the spacer 101. These passageways serve to duct the flow of lubricating oil from the interior of the quill shaft 30 towards the splines at its inboard end (See flow arrows on FIG. 2). By lubricating the splines, spline fretting is avoided. A spacer plug 116 fits within the hollow interior of the end portion 104 (See FIG. 2). The spacer plug is shimmed at 117 to hold the quill shaft 30 at the correct distance from the end of the output shaft 82. This limits the axial freedom of the quill shaft 30 and properly aligns the splines of the coupling collar 86 with the quill shaft thereby controlling the axial float of the quill shaft.

Figure 3:
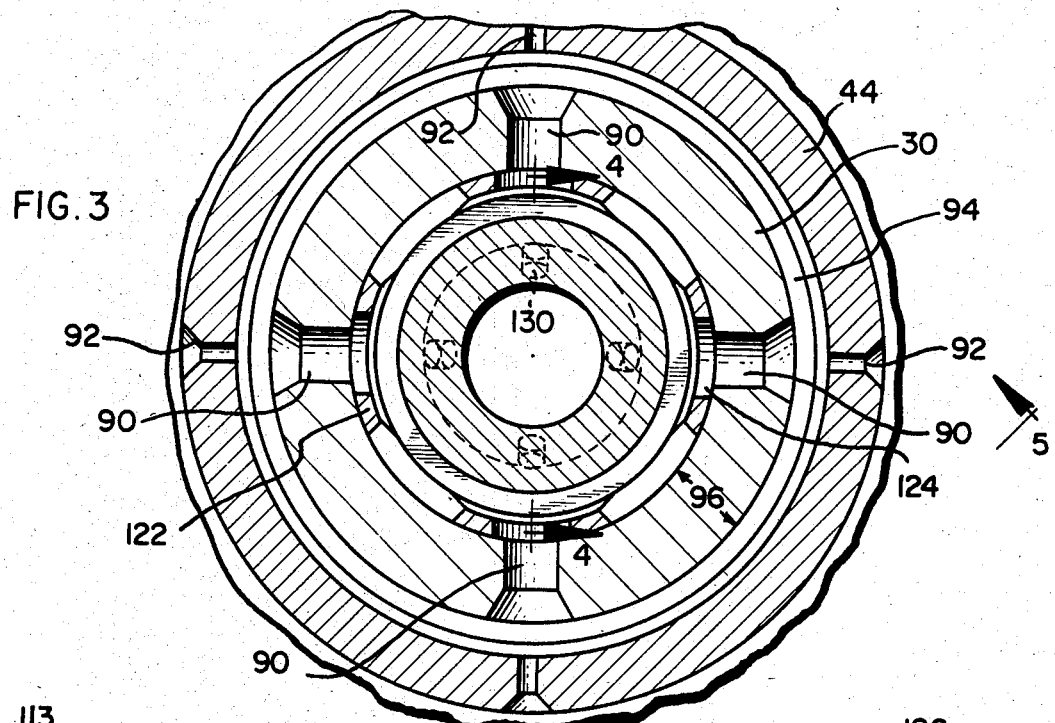
FIG. 3 is an enlarged, cross-sectional end view of the quill shaft and the associated components as viewed along line 3—3 of FIG. 2.

Turning now to the dam portion 108 of the insert 101, this portion is generally in the shape of a hollow, open-ended cylinder. Into this portion the deflector 102 is threadably joined. A dowel pin or epoxie can be used to ensure a tight fit. The outboard end of the dam portion 108 defines four raised fingers or lands 122 each defining an opening or port 124 which is adapted to be aligned with the opening 90 in the thickened section of the quill shaft 30 (See FIG. 3). The outer diameter of the lands is chosen to form a tight fit with the interior surface of the walls 96 of the quill shaft 30. Preferably the proximate end of each land 122 has a reduced cross section 126 such that when the insert 101 is forced into the quill shaft the lands are deflected or bent inwardly. In this manner, the lands are springingly held against the interior surface of the quill shaft in a tight, almost interference-like fit. These lands 122 then act as dams to prevent the oil forming at the interior surface of the quill shaft 30 from flowing out of the very openings 90 through which the oil entered when those openings were aligned with a oil jet 92. The space between each land allows oil to flow to and from each end of the shaft. This allows free communication of oil at the interior of the quill shaft 30 and prevents one end from hogging the available oil. In otherwords, a uniform distribution of oil or an even oil film results. The inboard end of the dam portion 108 is also provided with four openings 128 which communicate the interior with the exterior of the insert 101. The purpose of these openings will become understood once the deflector 102 is explained.

Turning now to the FIG. 2, the deflector 102, it will be recalled, fits within the outboard end of the insert 101. The deflector 102 is hollow and generally frusto-conical in shape. By imposing an obstacle between two diametrically opposed openings 90 in the quill shaft 30, lubricating oil is prevented from "short-circuiting" the interior of the quill shaft. Since invariably one of the oil jets 92 will be at a slightly higher pressure than the one diametrically opposite, lubricating oil entering from one jet (e.g., the lower jet 92' to use the orientation of FIG. 2), would effectively impede the oil entering from the opposite jet (e.g., the upper jet 92). The net effect would be that some of the oil would leak around and into the annular space between the oil jet holder 44 and the thicken portion 94 of the quill shaft 30. In addition, by quickly diverting the entering oil in an axial direction the flow of oil into the shaft is not impeded. Thus, deflector 102 improves the "efficiency" of the oil jets in lubricating the interior of the quill shaft 30. Openings or ports 130 are provided at the inboard end of the deflector 102 to channel lubricating oil into the interior of the insert 101. The downstream openings 128 in the insert 101 allows centrifugal force to discharge the oil from the interior of the insert to the interior wall of the quill shaft 30 at the inboard end. The openings or ducts 114 in the lip 113 then allow the oil to pass out of the inboard end of the quill shaft 30 and into the passageway between the splined end of the quill shaft and the collar 86 (See flow arrows in FIG. 2).

The outboard end of the deflector 102 also defines a frusto-conical surface 132 in the path of the oil entering the interior of the quill shaft 30. This surface 132 deflects a portion of the oil flow towards the outboard end of the quill shaft 30. Centrifugal force again forms a film of oil along the interior surface of the quill shaft. The lands 122, of course, prevent the oil film developing on the interior surface of the quill shaft from flowing out of the quill shaft when the openings 90 in the quill shaft are not aligned with the oil jets 92. Finally, the outboard end of the deflector 102 is preferably machined for removal by a wrench.

Turning now to FIG. 2A, the outboard end of the quill shaft 30 is provided with a plug 136 which seals that end of the quill shaft. The plug 136 defines a spud 138 which axially positions the outboard quill shaft 30 relative to the spacer element 68. The plug 136 is also provided with a plurality of openings 140 to vent the interior of the quill shaft 30 and to drain the oil at the interior of the quill shaft if that should become necessary. Openings or ports 142 are also provided to distribute oil at the interior of the quill shaft into the roots of the teeth of the sun gear 32 and the meshing teeth of the compound planetary gears 50. Other ports 144 are provided at the outboard end of the quill shaft 30 to discharge oil (See arrow 150) into those teeth 146 of the planetary gears 50 which mate with the outboard ring gear (See FIG. 1). When those ports 144 are not aligned with the teeth 146 of a planetary gear 50, lubricating oil is discharged (See arrow 151) directly onto the teeth of the outboard ring gear 56. Thus, maximum advantage is taken from the oil at the interior of the quill shaft and centrifugal force.

From the foregoing, it will be observed that numerous variations and modifications may be effected without departing from the true spirit and scope of the novel concept of the invention. For example, although the invention has been described in detail in the specific environment of a free-floating quill shaft and a differential epicentric planetary transmission, the basic principles of the invention are equally applicable to a journaled quill shaft or other geared transmission. Similarly, although the distribution of oil within the quill shaft in the embodiment described was towards either end of the quill shaft, distribution may be affected in only one direction without departing from the basic principles of the invention and the novel and unusually functional apparatus that is the subject of the invention. Thus, it should be understood that no limitation with respect to the specific apparatus illustrated herein is intended or should be deferred. It is, of course, intended to cover by the appended claims all such modifications as fall within the scope of the claims.

What is claimed is as follows:

1. Apparatus for lubricating a hollow coupling shaft having one end which is adapted to be rotationally coupled to a source of rotational energy and an opposite end which has a sun gear on it, said sun gear being adapted to mesh with at least three planetary gears, comprising:
    a. a source of lubricating fluid under pressure which discharges fluid through a port intermediate the ends of said shaft on the periphery of said shaft, said shaft defining at least one opening therein which is substantially aligned with said port during a portion of the rotational cycle of said shaft;
    b. damming means, carried by said shaft and disposed towards each end of said shaft at the periphery of said opening, for providing a barrier between the interior surface of said hollow shaft and said opening, whereby oil which entered into the interior of said shaft through said opening is precluded from being discharged out of said opening by centrifugal force when said opening is not aligned with said port; and
    c. means, within said shaft, for distributing oil formed along the interior surface of said hollow shaft into the teeth of said sun gear.

2. The apparatus set forth in claim 1, further including:
    a. diverting means, carried within said shaft, for discharging the fluid entering through said opening towards each end of said shaft.

3. The apparatus set forth in claim 1, wherein said shaft is radially supported by means for coupling said hollow coupling shaft to a splined end of a prime mover at one end of said shaft and radially supported by said at least three planetary gears which mesh with said sun gear at the opposite end of said shaft such that said shaft is freely floating between said three planetary gears and said splined end of a prime mover.

4. A method for lubricating a hollow shaft having one end adapted to mesh with a gear and an opposite end adapted to be coupled to a prime mover, comprising the following steps:
   a. providing a source of lubricating fluid under pressure which discharges through a fixed jet positioned at a spaced distance from the exterior of said shaft at a position intermediate the ends of said shaft;
   b. providing one opening in the wall of said shaft which is aligned with said jet at least during a portion of the rotational cycle of said shaft, whereby fluid is discharged intermittently into the interior of said shaft;
   c. damming the peripheral edges of said opening along the interior surface of said shaft at either end of said shaft, whereby fluid entering the interior of said shaft and discharged on to the interior surface of said shaft by centrifugal force is precluded from flowing out of said opening when said opening is not aligned with said jet; and
   d. ducting fluid from the interior surface of said shaft to the exterior surface of said shaft at either end of said shaft,
      whereby fluid supplied from the exterior of said shaft at a position intermediate the ends of said shaft flows intermittently into the interior of said shaft and continuously to the exterior surface of said shaft at each end.

5. The method set forth in claim 4, wherein said one opening in said shaft is intermediate the ends of said shaft.

6. The method set forth in claim 4, further including the steps of:
   a. providing an additional opening in said shaft which is diametrically opposite said one opening, said additional opening being aligned with said jet during a portion of the rotational cycle of said shaft;
   b. damming the peripheral edges of said opening along the interior surface of said shaft at either end of said shaft; and
   c. providing an obstacle at the interior of said shaft which is disposed between said openings and which diverts the fluid entering from said openings into the interior of said shaft towards at least one end of said shaft,
      whereby fluid supplied from said source through one of said openings is precluded from being directly discharged to the exterior of said shaft through that opening which is not aligned with said jet of fluid.

7. The method set forth in claim 4, wherein said one end of said shaft defines a sun gear and wherein fluid is ducted from the interior surface of said shaft to the roots of the teeth on said sun gear, whereby said sun gear teeth are lubricated.

8. The method set forth in claim 4, wherein the other end of said shaft is splined and wherein fluid is ducted from the interior surface of said shaft at the other end of said shaft to the roots of said splines at the other end of said shaft.

9. The method set forth in claim 4, wherein said shaft opening is dammed by providing a land around the interior periphery of said opening.

10. The method set forth in claim 7, wherein said shaft is free floating relative to said prime mover and the three planetary gears in mesh with said sun gear.

11. The method set forth in claim 4, further including the step of:
   a. providing an additional opening in said shaft which is periodically aligned with said jet during the rotational cycle of said shaft;
   b. damming the peripheral edges of said additional opening at the interior of said shaft at either end of said shaft; and
   c. providing at the interior surface of the shaft between said two openings an axial channel,
      whereby the film of fluid forming along the interior surface of said shaft is free to flow towards either end of said shaft.

12. The method set forth in claim 11, wherein said axial channel is formed by damming one adjacent peripheral edge of each opening.

13. In a transmission adapted to receive rotational energy from a prime mover, having said transmission a plurality of gears including at least three planetary gears, and a source of lubricating fluid under pressure, apparatus comprising:
   a. a hollow shaft having a sun gear at one end which is adapted to mesh with said planetary gears, the other end of said shaft being adapted to be coupled to said prime mover, said shaft defining: an opening intermediate the ends of said shaft which is adapted to receive lubricating fluid from said source periodically during the rotational cycle of said shaft, and a plurality of ports, which communicate the interior surface of said shaft at said one end with the roots of the teeth of said sun gear;
   b. distributor means, carried within said shaft, for distributing lubricating fluid entering into said opening along the interior surface of said shaft and towards said one end of said shaft; and
   c. damming means, carried by said shaft along the interior surface of said shaft, for damming said opening from the lubricating fluid held against the interior surface of said shaft by centrifugal force,
      whereby lubricating fluid periodically enters the interior of said shaft, accumulates along the interior surface of said shaft and is uniformly and continuously channeled into the teeth of said sun gear from the interior of said shaft when said shaft is rapidly rotated by said prime mover.

14. The apparatus set forth in claim 13, wherein the other end of said shaft is splined, and wherein said distributor means includes means for channeling lubricating fluid from the interior surface of said shaft and out of the splined end of said shaft.

15. The apparatus set forth in claim 13, wherein: said planetary gears housed within a carrier free are to rotate within said transmission and about said sun gear, and wherein said one end of said shaft defines at least one port aligned to discharge lubricating fluid from the interior surface of said shaft in the direction of said carrier.

16. The apparatus set forth in claim 13, further including: diversion means, carried within said shaft, for diverting the lubricating fluid entering the interior of said shaft through said opening towards each end of said shaft.

17. The apparatus set forth in claim 16, wherein said diversion means is carried by said damming means.

18. The apparatus set forth in claim 17, wherein said damming means is removably inserted within said shaft.

19. The apparatus set forth in claim 13, wherein said shaft defines a plurality of radial openings and wherein said source includes a plurality of oil distribution jets which are radially aligned with said openings.

20. The apparatus set forth in claim 19, wherein said openings are at a distance spaced apart from said jets.

21. The apparatus set forth in claim 13, wherein said shaft defines two angularly spaced apart openings which are periodically aligned with said source, and wherein said damming means defines two raised lands, each having a bore aligned with said openings whereby the periphery of each of said openings is dammed along the interior surface of said shaft said lands having adjacent edges which are spaced apart frm each other so as to define an axial channel along the interior surface of said shaft, whereby the film of lubricating fluid formed on the interior surface of said shaft by centrifugal force is uniformally distributed along the interior surface of said shaft and is precluded from draining out of said openings when said openings are not aligned with said source.

22. Apparatus, comprising:
  a. a quill shaft defining at least one port which communicates the interior surface of said shaft with its exterior surface, said port being adapted to receive a supply of lubricating fluid at least during a portion of the rotating cycle of said shaft;
  b. a gear carried by said shaft, said gear and said shaft defining a plurality of passageways from the interior surface of said shaft to the roots of the teeth on said gear; and
  c. a land disposed along the interior surface of said shaft and defining an operative peripherially aligned with the interior edges of said port at each end of said shaft, at least one edge of said land and the interior surface of said shaft defining an axial channel to one side of said port, whereby the film of lubricating fluid formed against the interior surface of said shaft by centrifugal force is free to distribute itself uniformly and axially within said shaft and is precluded from flowing out of said port when said shaft is rotating and not supplied with lubricating fluid therethrough.

23. The apparatus set forth in claim 22, further including means, disposed between the center of said shaft and said land for diverting lubricating fluid towards at least one end of said shaft.

24. The apparatus set forth in claim 22, wherein said one end of said shaft is open and is adapted to receive a plug defining at least one port aligned with the interior surface of said shaft.

* * * * *